(12) United States Patent
Ishii

(10) Patent No.: US 8,473,856 B2
(45) Date of Patent: Jun. 25, 2013

(54) INFORMATION PROCESSING APPARATUS, INFORMATION PROCESSING METHOD, AND INFORMATION PROCESSING PROGRAM

(75) Inventor: Yukinori Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1120 days.

(21) Appl. No.: 12/026,344

(22) Filed: Feb. 5, 2008

(65) Prior Publication Data

US 2008/0222082 A1 Sep. 11, 2008

(30) Foreign Application Priority Data

Mar. 6, 2007 (JP) ................................. 2007-055894

(51) Int. Cl.
*G06F 3/048* (2006.01)
*G06F 3/00* (2006.01)

(52) U.S. Cl.
USPC ............ 715/764; 715/762; 715/783; 715/788

(58) Field of Classification Search
USPC .................. 715/762, 764, 783, 788; 709/203, 709/228
See application file for complete search history.

(56) References Cited

U.S. PATENT DOCUMENTS

| | | | | |
|---|---|---|---|---|
| 6,580,440 | B1 * | 6/2003 | Wagner et al. | 715/762 |
| 7,412,089 | B2 * | 8/2008 | Squires et al. | 382/141 |
| 7,546,602 | B2 * | 6/2009 | Hejlsberg et al. | 719/313 |
| 7,603,408 | B1 * | 10/2009 | McGinnis et al. | 709/203 |
| 8,065,629 | B1 * | 11/2011 | Ragan | 715/799 |
| 2005/0131928 | A1 * | 6/2005 | Gauthey et al. | 707/101 |
| 2006/0101343 | A1 | 5/2006 | Machida | |
| 2007/0088707 | A1 * | 4/2007 | Durgin et al. | 707/10 |
| 2007/0127426 | A1 * | 6/2007 | Watters et al. | 370/338 |
| 2007/0142930 | A1 * | 6/2007 | Crisan et al. | 700/17 |
| 2007/0198727 | A1 * | 8/2007 | Guan | 709/228 |
| 2009/0070101 | A1 * | 3/2009 | Masuyama et al. | 704/9 |

FOREIGN PATENT DOCUMENTS

| | | |
|---|---|---|
| JP | 2002-91558 | 3/2002 |
| JP | 2006-48465 | 2/2006 |
| JP | 2006-133520 | 5/2006 |

OTHER PUBLICATIONS

Nov. 15, 2011Japanese official action in connection with counterpart Japanese patent application.

* cited by examiner

*Primary Examiner* — Nicholas Augustine
(74) *Attorney, Agent, or Firm* — Cooper & Dunham LLP

(57) ABSTRACT

An information processing device, an information processing method, and an information processing program capable of reducing the workload of a developer and human errors and easily customizing a display menu are disclosed. The method includes the steps of reading the display menu data stored in an HDD based on an instruction received by a CPU of an information processing device via an operations device, extracting each of plural menu elements, writing the extracted menu elements in a CSV file in CSV format to create a CSV file from the display menu data, and creating a location data file and an element definition file from the created CSV file.

17 Claims, 10 Drawing Sheets

FIG.6

| | ATTACHED DATA FLAG | TYPE | FILE NAME | X COORDINATE | Y COORDINATE | WIDTH W | HEIGHT H | DISPLAY POSITION IN REGION | COLOR | FONT | FONT SIZE |
|---|---|---|---|---|---|---|---|---|---|---|---|
| 1 | 0 | text | Text_1.txt | 4 | 7 | 108 | 20 | center | 0xFFFFFF | MS Gothic | 24 |
| 2 | 0 | bitmap | Bitmap_1.jpeg | 500 | 7 | 30 | 20 | | | | |
| 3 | 0 | text | Text_2.txt | 502 | 9 | 26 | 16 | center | 0xFFFFFF | MS Gothic | 16 |
| 4 | 0 | button | B_001.swf | 4 | 50 | 100 | 30 | | | | |
| 4 | 1 | text | Text_3.txt | 0 | 0 | 100 | 30 | center | 0xFFFFFF | MS Gothic | 16 |
| 5 | 0 | button | B_001.swf | 110 | 50 | 100 | 30 | | | | |
| 5 | 1 | text | Text_4.txt | 0 | 0 | 100 | 30 | center | 0xFFFFFF | MS Gothic | 16 |
| 6 | 0 | botton | B_002.swf | 600 | 50 | 20 | 20 | | | | |
| 6 | 1 | icon | I_001.bmp | 0 | 0 | 20 | 20 | right | 0xFFFFFF | MS Gothic | 16 |
| 7 | 0 | button | B_002.swf | 600 | 200 | 20 | 20 | | | | |
| 7 | 1 | icon | I_002.bmp | 0 | 0 | 20 | 20 | center | | | |
| 8 | 0 | text | – | 600 | 100 | 20 | 20 | center | 0x000000 | MS Gothic | 16 |
| . | . | . | . | . | . | . | . | . | . | . | . |
| . | . | . | . | . | . | . | . | . | . | . | . |

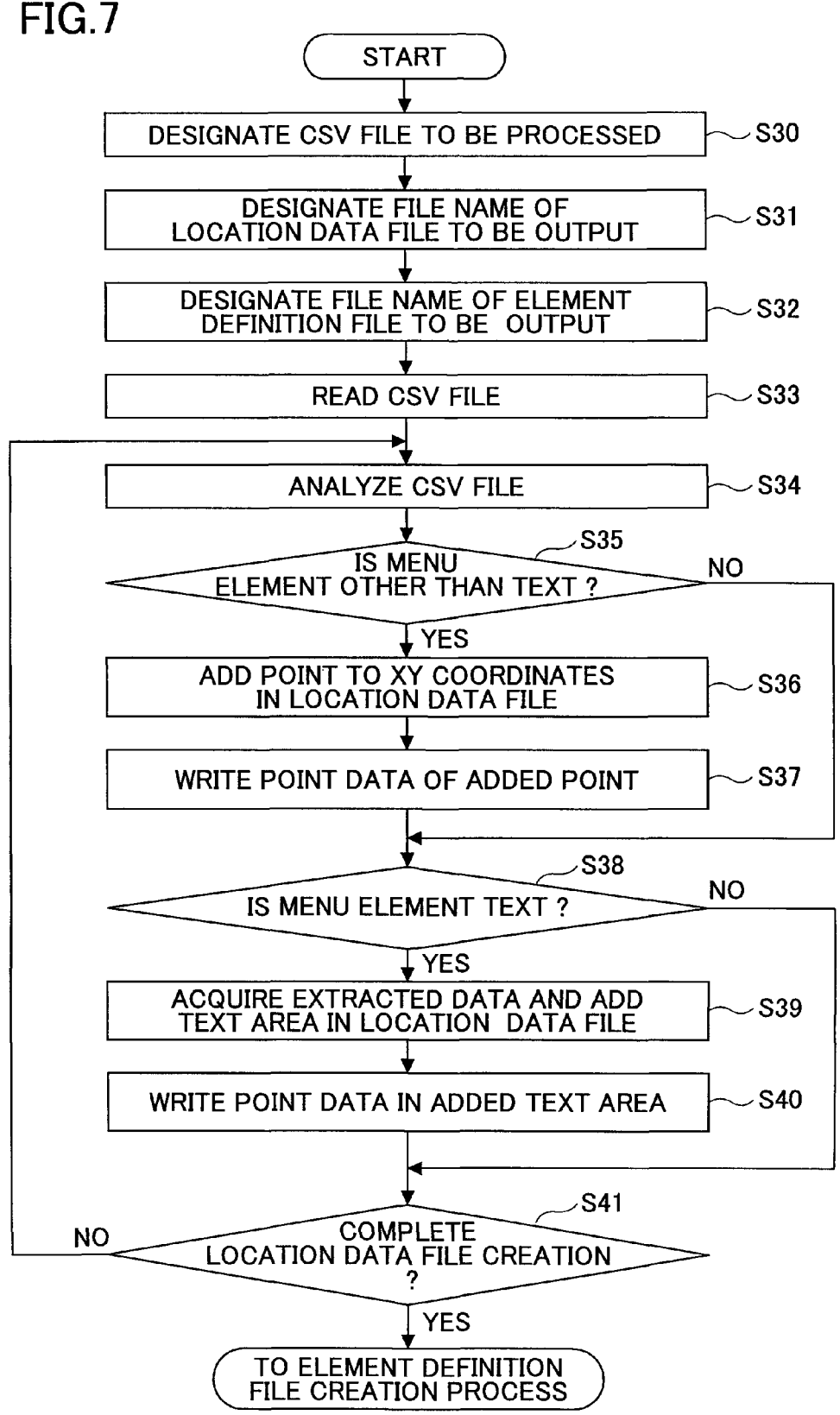

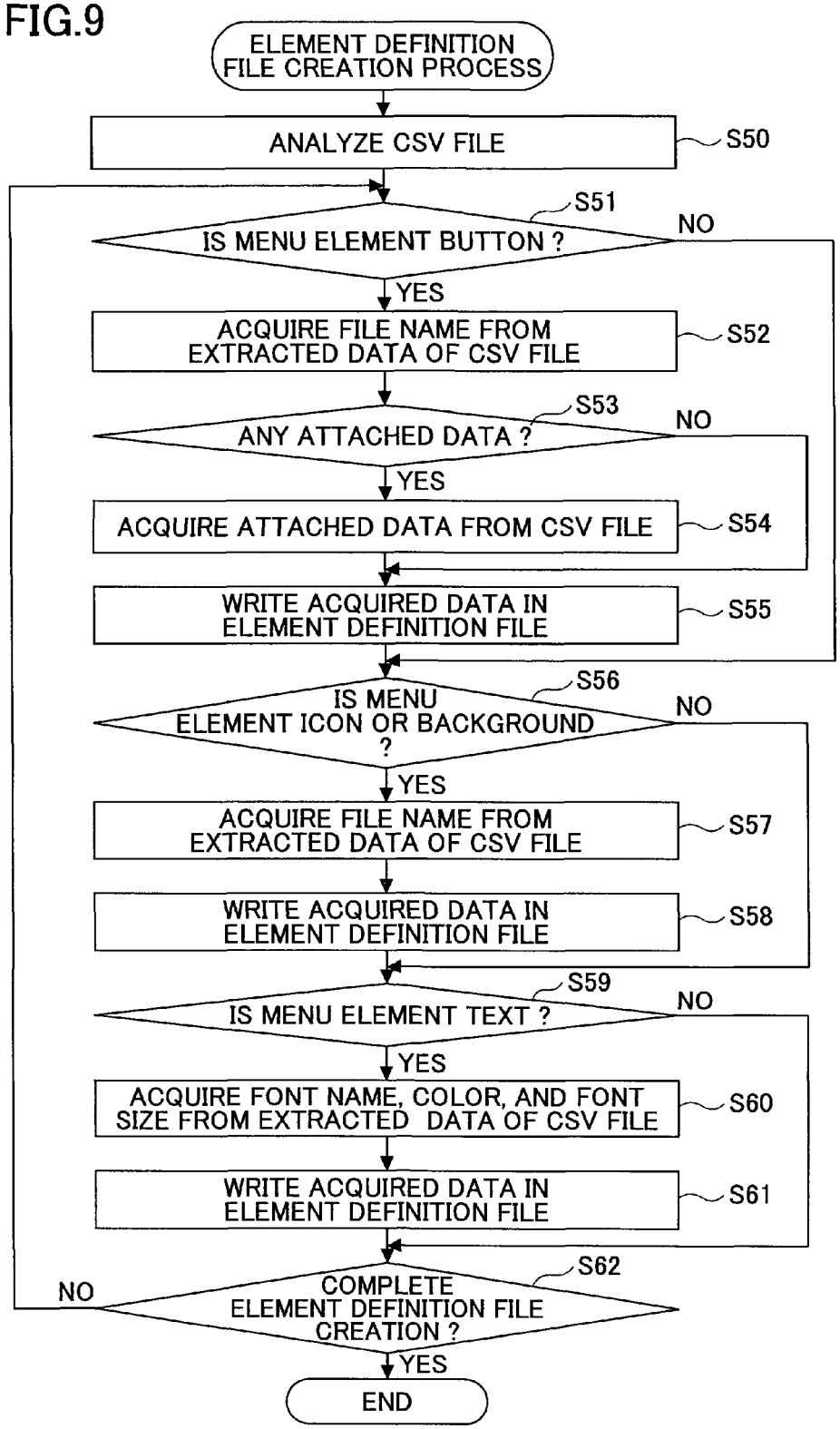

FIG.10

```
<img name="W_001.swf" mc="bitmap_1" cid="CID_bitmap_1" />
<img size="24" align="center" col="0XFFFFFF" font="MS-GT" mc="text_2" cid="CID_text_2" />
<img name="Bitmap_1.jpeg" mc="bitmap_3" cid="CID_bitmap_3" />
<img size="16" align="left" col="0XFFFFFF" font="MS-GT" mc="text_4" cid="CID_text_4" />
<msgbtn name="B_001.swf" mc="button_5" x="0" y="0" w="100" h="30" size="16" col="0XFFFFFF" cid="CID_button_5" />
<msgbtn name="B_001.swf" mc="button_7" x="0" y="0" w="100" h="30" size="16" col="0XFFFFFF" cid="CID_button_7" />
<msgbtn name="B_002.swf" mc="button_9" x="0" y="0" w="20" h="20" cid="CID_button_9" />
<msgbtn name="B_002.swf" mc="button_11" x="0" y="0" w="20" h="20" cid="CID_button_11" />
<img size="16" align="left" col="0XFFFFFF" font="MS-GT" mc="text_13" cid="CID_text_13" />
...
```

INFORMATION PROCESSING APPARATUS, INFORMATION PROCESSING METHOD, AND INFORMATION PROCESSING PROGRAM

BACKGROUND

1. Technical Field

This disclosure relates to an information processing apparatus, an information processing method, and an information processing program capable of creating information representing a display menu to be displayed on a prescribed display device from data having a prescribed data format and representing an original display menu, wherein the aspect of the created display menu is similar to that of the original display menu.

2. Description of the Related Art

Recently, there have been developed techniques whereby a developer can easily create content to be displayed as a content menu on a display device such as a monitor without any specialized technical knowledge or technique of creating the content (see, for example, Patent Document 1).

Patent Document 1: Japanese Patent Application Publication No. 2006-048465

However and unfortunately, the technique proposed in the Patent Document 1 is designed to create content for a display device connected to, for example, a personal computer (PC). Because of this limitation, it is inconvenient when content is required to be displayed on a display device included in an image processing device capable of displaying limited types of content. In addition, a developer has to analyze the content and re-create the content so that the re-created content can be displayed on the display device by manually inputting the position data of menu elements such as icons to be displayed on the display menu and the data determining whether each of the display elements is an icon or characters based on the analyzed results. Because of the inconvenience, the workload of the developer is heavy and human error may occur in the operations. Further and unfortunately, the content created by this method cannot be modified easily.

BRIEF SUMMARY

According to aspects of this disclosure, there is provided an information processing apparatus, an information processing method, and an information processing program capable of reducing the workload of the developer and human errors and creating a display menu that can be further modified easily.

According to an aspect of this disclosure, there is provided an information processing device including a storage unit storing display menu information representing a display menu to be displayed on a display unit, the display menu information being in a prescribed data format, and a creation unit extracting a menu element as an element displayed on the display menu based on the display menu information stored in the storage unit and creating location information representing a locating position of the extracted menu element and element definition information specifying the menu element located at the locating position indicated by the location information.

According to another aspect of this disclosure, the creation unit includes a first creation unit extracting the menu element based on the display menu information and creating conversion information in prescribed text format based on the information specifying the extracted menu element; and a second creation unit creating the location information and the element definition information based on the conversion information created by the first creation unit.

According to still another aspect of this disclosure, the first creation unit extracts a menu element having a type of a button, a text, or an icon and background and crating the conversion information including the information indicating the type of the extracted menu element.

According to still another aspect of this disclosure, in the process of extracting the menu element based on the display menu information, when a region of the display menu is defined in a two dimensional coordinate system, the first creation unit extracts the coordinate values indicating the locating position of the menu element based on the defined two dimensional coordinate system and creates the conversion information including the information indicating the coordinate values.

According to still another aspect of this disclosure, the second creation unit creates the location information including an index indicating the locating position of the menu element using the coordinate values output to the conversion information.

According to still another aspect of this disclosure, the second creation unit creates the element definition information including element specifying information specifying the information indicating the menu element to be located at the locating position specified by the location information.

According to still another aspect of this disclosure, the first creation unit, in the process of extracting the menu element from the display menu information, extracts specifying information specifying an image indicating the menu element and creates the conversion information including the specifying information, and the second creation unit creates the element definition information including the specifying information output to the conversion information.

According to still another aspect of this disclosure, the first creation unit, in the process of extracting the menu element from the display menu information, in a case where the type of the menu element is text, extracts coordinate values indicating the locating position of the menu element when a region of the display menu is defined in a two dimensional coordinate system and the height and the width of a locating region where the menu element is located and creates the location information including indicating each of the coordinate values, height, and width, and the second creation unit, in a case where the type of the menu element is text, creates the location information including the locating region of the menu element created by using the coordinate values, height, and width, each output to the conversion information.

According to still another aspect of this disclosure, when the type of the menu element is text, a display image of the menu element includes a character image indicating a character. The first creation unit, in the process of extracting the menu element from the display menu information, when the type of the menu element is text, creates the conversion information including the information indicating each of the size and the aspect of the character indicated by a character image included in the display image of the menu element. The second creation unit, when the type of the menu element is text, creates the element definition information including the information indicating each of the size and the aspect of the character output to the conversion information.

According to still another aspect of this disclosure, when the type of the menu element extracted from the display menu information is a button and, on the menu element, there is displayed another menu element whose type is text or an icon, the first creation unit creates the conversion information including information of the menu element whose type is text or an icon as attached information of the menu element whose type is text.

According to still another aspect of this disclosure, the second creation unit creates the element definition information by associating the information indicating the menu element output to the conversion information by the first creation unit as the attachment information of the menu element whose type is a button with the information indicating the menu element whose type is a button.

According to still another aspect of this disclosure, in a case where the type of the menu element is a button, when a region of the display menu is defined in a two dimensional coordinate system, the second creation unit creates the location information including the information indicating the coordinate values indicating the upper right-hand corner of the locating region where the menu element is located.

According to still another aspect of this disclosure, the first generation unit gives a first information name to the index included in the location information, the first information name including the type name of the menu element located at the locating position specified by the index and a line number where information of the menu element is output in the conversion information.

According to still another aspect of this disclosure, the second generation unit gives a second information name to the information with respect to a display aspect of the menu element included in the element definition information, the second information name including the first information name given to the index specifying the locating position where the menu element is located and a prescribed character.

According to still another aspect of this disclosure, there is provided an information processing method including a reading step of reading display menu information stored in a storage unit in a prescribed data format, the menu information indicating a display menu displayed on a display unit, and a creating step of extracting a menu element as an element to be displayed on the display menu from the display menu information read in the reading step and creating location information indicating the locating position of the extracted menu element and element definition information specifying the menu element to be located at the locating position indicated by the location information.

According to still another aspect of this disclosure, there is provided an information processing program causing a computer to execute a method described above.

According to an aspect of this disclosure, a display menu having a similar aspect with another display menu displayed based on display menu information in a prescribed data format can be reproduced easily and the reproduced display menu is displayed on a display device of, for example, an image processing device. Further, since the location information and the element definition information are created automatically without requiring a developer's intervention, it is possible to reduce the workload of the developer and human error. Further, since the location information and the element definition information are separately created, the developer does not always have to customize both information items depending on cases, thereby reducing the workload of the developer.

In addition, for example, when it is necessary to change the locating position of a menu element, the locating position can be changed easily by changing the locating position indicated by the locating information. Because of this feature, a developer can easily customize the display menu, thereby reducing the workload of the developer.

Further, for example, when it is necessary to change a display aspect of the menu element without changing the locating position of the menu element on a display menu, it can be achieved by changing the element definition information alone. Because of this feature, a developer can customize the display menu easily, thereby reducing the workload of the developer.

Still further, when the type of the menu element is text, various settings with respect to a display aspect of the character image included in the display image of the menu element can be designated.

Still further, when the locating position of a menu element whose type is text or an icon is located on a menu element whose type is a button, since the menu element whose type is text or an icon is treated as the attached information of the menu element whose type is a button, the relationship between those two menu elements can be clarified.

Still further, since the locating position of the menu element whose type is text or an icon can be associated with the locating position of the menu element whose type is a button, it is possible to clarify the location position of each menu element.

Still further, it is possible to clarify the correspondence relationship between the information of the menu element in the conversion information and the index in the location information.

Still further, it is possible to clarify the correspondence relationship between the information of the menu element in the conversion information and the information of the menu element in the element definition information. It is also possible to clarify the correspondence relationship between the index in the location information and the information of the menu element in the element definition information.

BRIEF DESCRIPTION OF THE DRAWINGS

FIG. 6 is a diagram showing the data structure of the CSV file created by converting the display menu data representing the display menu of FIG. 2;

FIG. 7 is a flowchart showing a location data creation process according to the embodiment of the present invention;

FIG. 9 is a flowchart showing an element definition file creation process according to the embodiment of the present invention; and FIG. 10 is a diagram showing the data structure of an element definition file according to the embodiment of the present invention.

DETAILED DESCRIPTION OF THE PREFERRED EMBODIMENTS

In the following, exemplary embodiments of the information processing apparatus, the information processing method, and the information processing program according to the present invention are described in detail with reference to the accompanying drawings.

Figure 1:
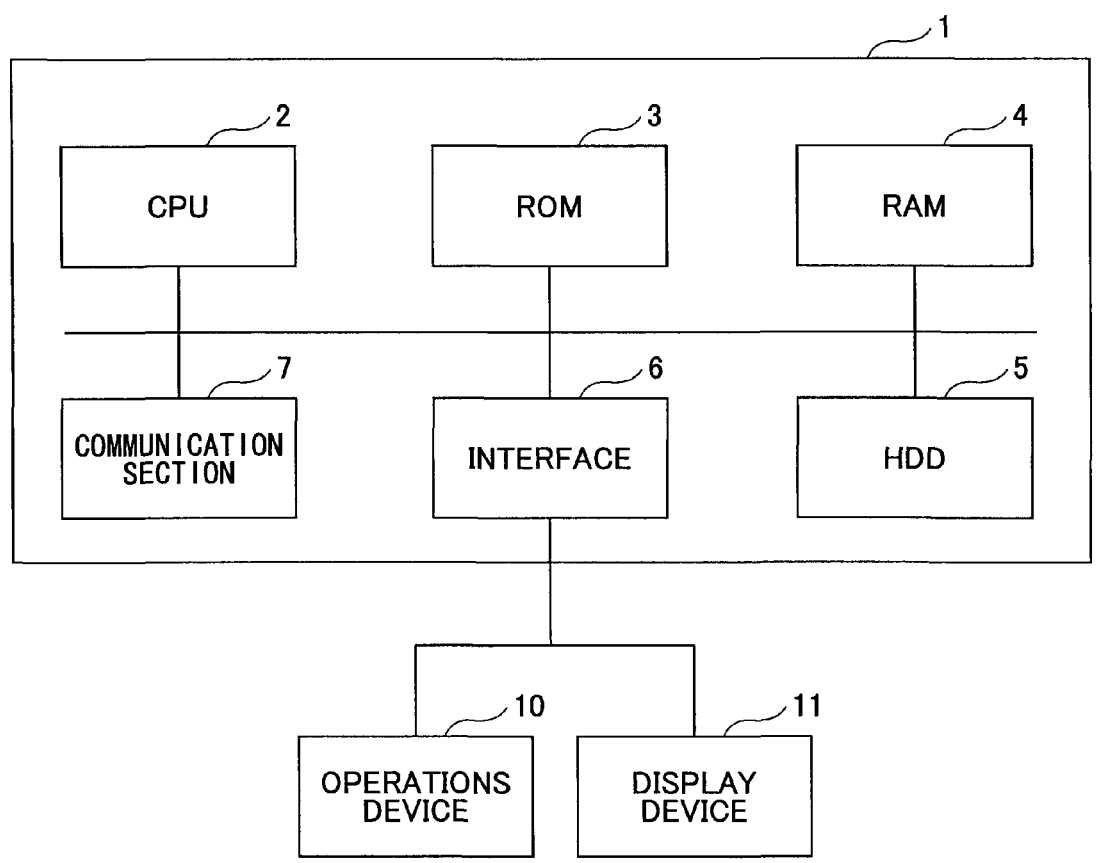
FIG. 1 is a diagram showing a hardware configuration of an information processing apparatus according to one embodiment of the present invention.

FIG. 1 illustrates an exemplary hardware configuration of an information processing apparatus 1 according to an embodiment of the present invention. The information processing apparatus 1 includes a Central Processing Unit (CPU) 2, a Read Only Memory (ROM) 3 storing various programs and data, a Random Access Memory (RAM) 4, a Hard Disk Drive (HDD) 5, an interface 6, a communication section 7, and a bus (reference numeral not shown) connected therebetween. The information processing apparatus 1 is connected to an operations device 10 and a display device 11 via the interface 6. The operations device 10 includes various operation keys and a mouse and allows a user such as a developer to input. The display device 11 may be, for example, a Cathode Ray Tube (CRT) or a Liquid Crystal Display (LCD) monitor. Further, the information processing apparatus communicates data with an external device via the communication section 7.

Figure 2:
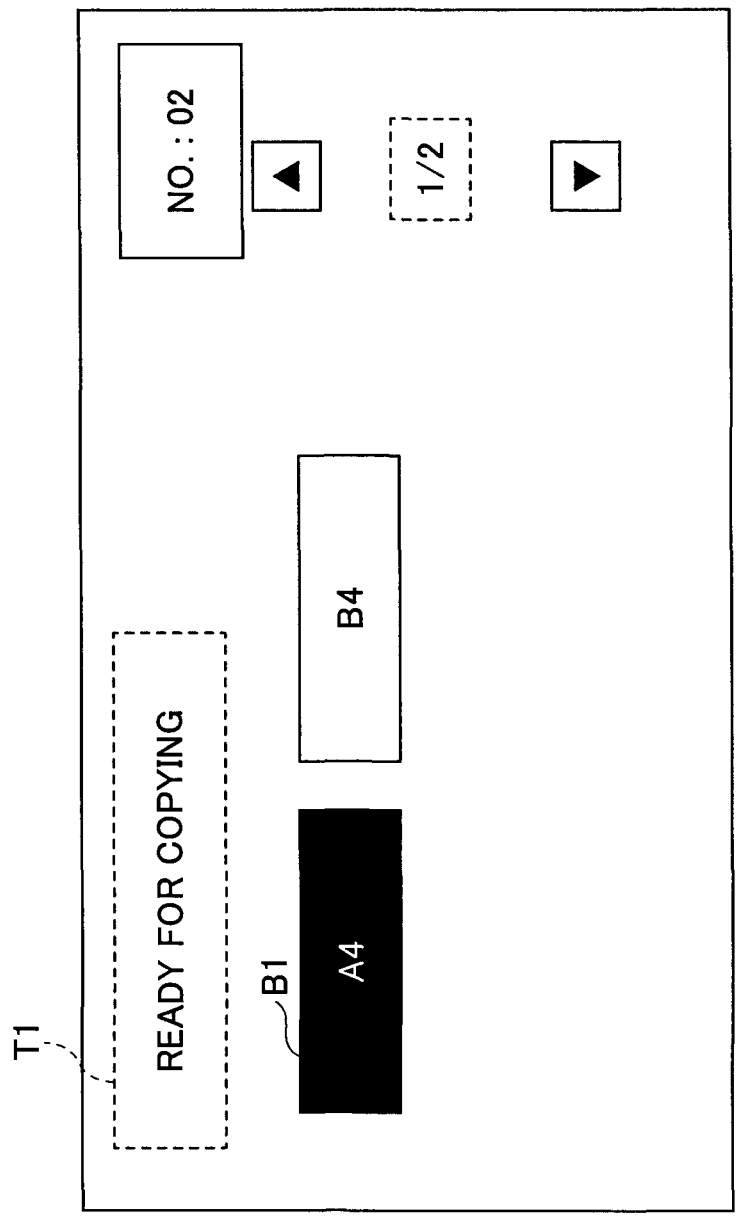
FIG. 2 illustrates an example of a display menu represented by the display menu data according to the embodiment of the present invention.

The HDD 5 stores the display menu data created by a prescribed application such as "Director", the display menu data representing a display menu. FIG. 2 shows an example of the display menu represented by the display menu data. The display menu of FIG. 2 may be used when a user sets printing conditions and prints data using an image processing device. In this display menu, various display elements such as a button B1 and text T1 are displayed. It should be noted that the term "menu element" refers to a unit of image or information displayed in a display menu and includes a button, text, an icon, and background. An image representing each menu element and the display configuration of the image may be designed by a designer. Hereinafter, a file including image data representing each of those image elements is called a menu element file. The menu element file is in, for example, swf format and bitmap format. In addition to the menu element file, a CSV file, a location data file, and an element definition file described in detail below are stored in the HDD 5.

Figure 3:
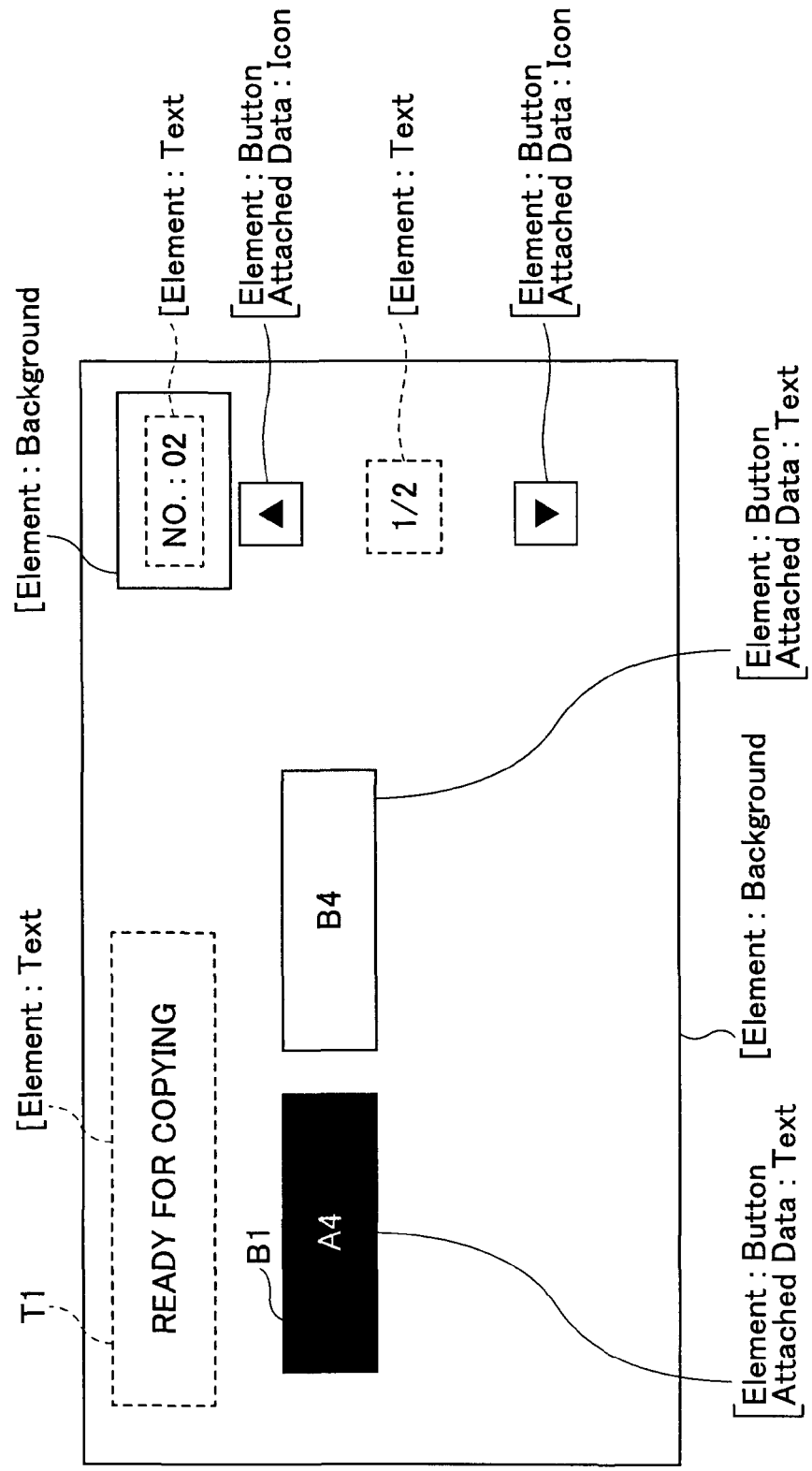
FIG. 3 is a drawing in which each title of the corresponding menu element is added to FIG. 2 for illustrative purposes.

An information processing program according to an embodiment of the present invention is stored in the ROM 3. The CPU 2 executes the information processing program and creates the location data file and the element definition file that are necessary to create the display menu whose display aspect is similar to that of the display menu represented by the display menu data stored in the HDD 5. More specifically, the CPU 2 analyzes the display menu data stored in the HDD 5, extracts each menu element to be displayed in the display menu, creates a CSV file in which the data with respect to the extracted menu elements are stored in CSV format, analyzes the created CSV file, and creates the location data file and the element definition file. Further, when text or an icon of the menu element is located on a button, the text or the icon is treated as a menu element attached to the button and the data of the text or the icon are treated as the attached data. FIG. 3 is a drawing in which each title of the corresponding menu element is added to FIG. 2 for illustrative purposes. As shown in FIG. 3, for example, the button B1 is associated with the text data as the attached data. Further, the term "location data file" refers to a file of data indicating the locating position of each menu element to be displayed in the display menu. The term "element definition file" refers to a file of data associating each point designated in the location data file with the corresponding menu element so that the menu element is located at the associated point. Further detailed description is provided in the following descriptions of the operations.

Operations

Figure 4:
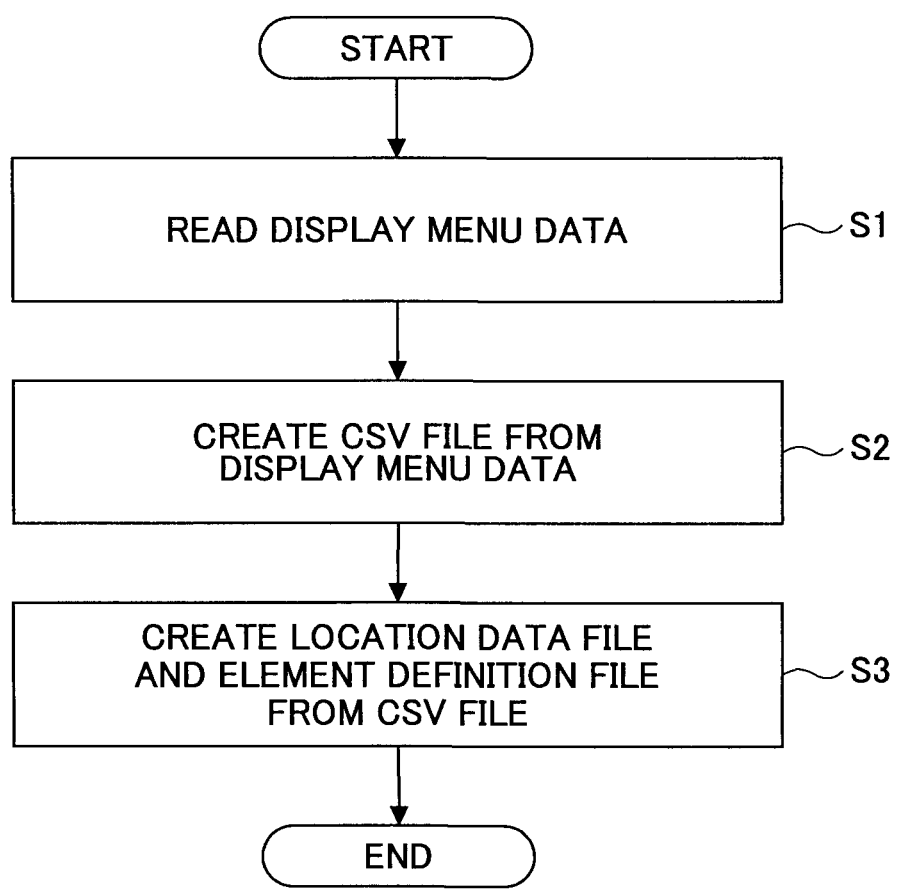
FIG. 4 is a flowchart showing an outline of a display menu conversion process according to the embodiment of the present invention.

Next described is the procedure of a display menu conversion process performed by the information processing apparatus 1 according to an embodiment of the present invention. FIG. 4 is a flowchart showing an outline of a display menu conversion process according to the embodiment of the present invention.

<Outline of the Process>

When the CPU 2 in the information processing apparatus 1 receives an input instruction to read the display menu data via the operations device 10, the CPU 2 reads the display menu data stored in the HDD 5 accordingly (step S1). The CPU 2 extracts each menu element from the display menu data and creates a CSV file from the display menu data by writing each extracted menu element into a file (CSV file) in CSV format (step S2). Then, the CPU 2 creates the location data file and the element definition file from the created CSV file (step S3).

Figure 5:
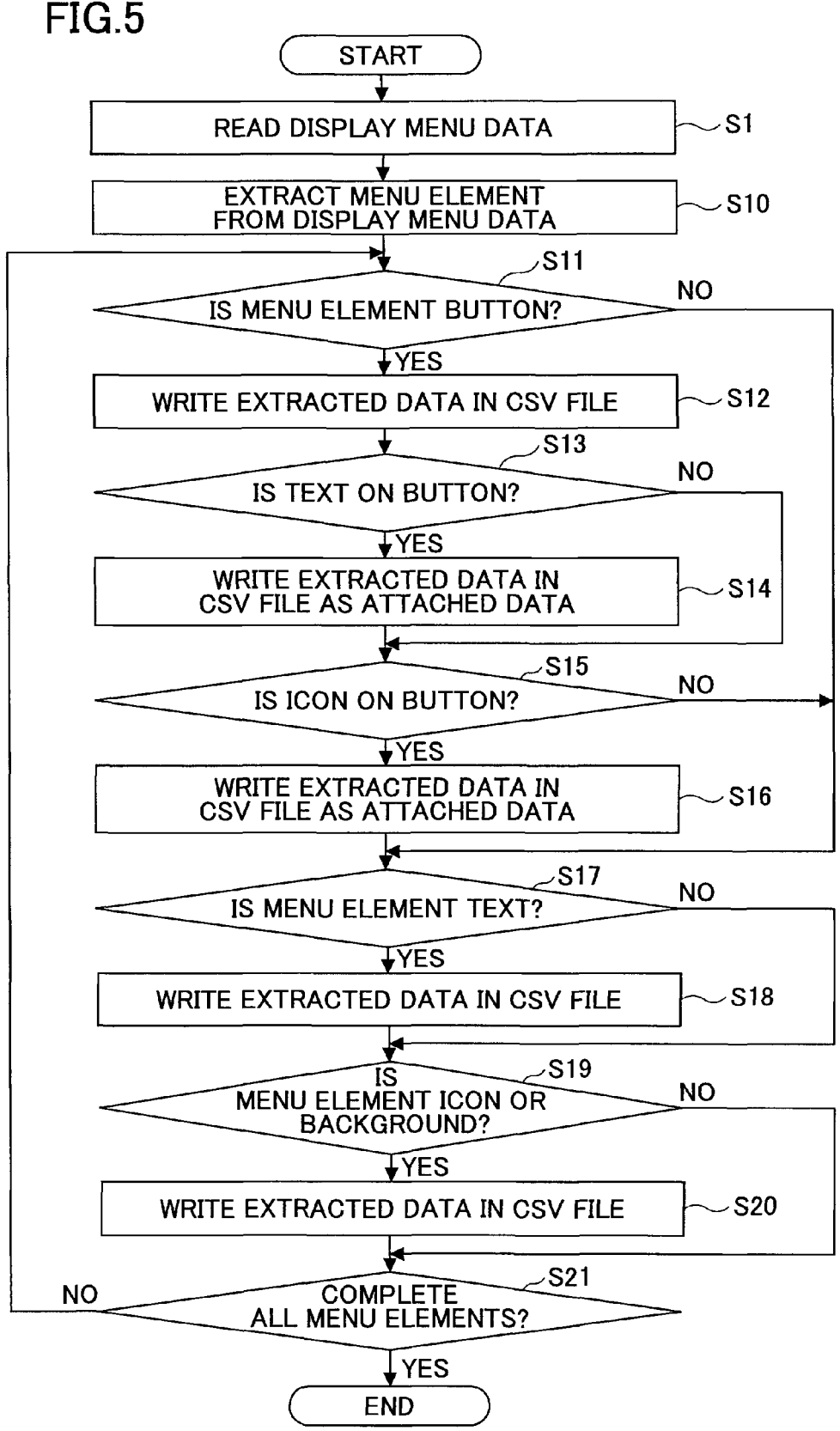
FIG. 5 is a flowchart showing a CSV file creation process according to the embodiment of the present invention.

Next, details of the CSV file creation process performed in step 2 and the location data file creation process and the element definition file creation process performed in step 3 are described. FIG. 5 is a flowchart showing a CSV file creation process according to the embodiment of the present invention.

<CSV File Creation Process>

When the CPU 2 in the information processing apparatus 1 receives an input instruction to read the display menu data via the operations device 10, the CPU 2 reads the display menu data stored in the HDD 5 accordingly (step S1) and performs the CSV file creation process. In the CSV file creation process, first, the CPU 2 extracts each menu element (step S10). More specifically, the CPU 2 extracts data in a prescribed data format such as bitmap data, swf data created by using Flash (Trademark), and text data as the menu element from each data element included in the display menu data. Then, as described below, the CPU 2 determines the type of each of the extracted menu elements and writes the data representing each menu element (menu element file data) as the extracted data in a CSV file in CSV format. It should be noted that when the CSV file is read and data are written in a CSV file, for example, Flash Java (Trademark), Script (JSFL), and a conventional API may be used.

First, in step S11, the CPU 2 determines whether the type of the extracted menu element is "button". When the determination is affirmative (YES in step S11), with respect to the menu element file, the CPU 2 writes "0" as an attached data flag, the type, the X coordinate value and the Y coordinate value representing the starting position of the locating position of the menu element, the width W, the height H, and the file name (identification information) in a CSV file in CSV format as the extracted data (step S12). It should be noted that when the type of the extracted menu element is "button", the starting position of the locating position of the menu element refers to the upper right-hand corner of the region where the menu element is located and the position coordinates of the upper right-hand corner in a two dimensional coordinate system is expressed by using the X coordinate value and the Y coordinate value. However, in the embodiments of the present invention, the starting position is not limited to the upper right-hand corner. Further, the value of the attached data flag indicates whether the data are the attached data. When the value is "1", the data are the attached data, and when the value is "0", the data are not the attached data. The type refers to any one of the "button", the "text", and the "icon or background" as the type of the menu element.

Next, the CPU 2 determines whether the text data to be displayed on the menu element is included (step S13). When the determination is affirmative (YES in step 13), the CPU 2 writes "1" as the attached data flag, the type, the X coordinate value and the Y coordinate value representing the starting position, the width W, the height H, and the file name in a CSV file as the attached data of the menu element (step S14). Next, the CPU 2 determines whether the icon to be displayed on the menu element is included (step S15). When the determination is affirmative (YES in step S15), the CPU 2 writes "1" as the attached data flag, the type, the X coordinate value and the Y coordinate value representing the starting position, the width W, the height H, and the file name in a CSV file as the attached data of the button (step S16).

Further, the CPU 2 determines whether the type of the extracted menu element is "text" (step S17). When the determination is affirmative (YES in step 17), with respect to the menu element file, the CPU 2 writes the type, the X coordinate value and the Y coordinate value representing the starting position, the width W, the height H, the color, the font name, a display position in the region, and the file name in a CSV file as the extracted data (step S18). The term "display position in the region" refers to the display position in the region where the menu element is located. When the value of the display position in the region is "center", "left", and "right", the object to be displayed is displayed center-, left-, and right-justified, respectively.

Further, the CPU 2 determines whether the type of the extracted menu element is the "icon or background" (step S19). When the determination is affirmative (YES in S19), with respect to the menu element file, the CPU 2 writes the type, the X coordinate value and the Y coordinate value representing the starting position, the width W, the height H, and the file name in a CSV file as the extracted data (step S20). In this manner, the CPU 2 repeats the steps of S11 through S20 for each menu element extracted from the display menu data. When all the processes in steps S11 through S20 of the all menu elements are finished, the determination in step S21 becomes affirmative and the creation of the CSV file is completed.

As a result of the CSV file creation process, a CSV file as shown in FIG. 6 is stored in the HDD 5. FIG. 6 is a diagram showing the data structure of the CSV file created by converting the display menu data representing the display menu of FIG. 2. As shown in FIG. 6, the data including the attached data are separately listed for each menu element. The data of each menu element include the data of the attached data flag, the type, the file name, the X coordinate value and the Y coordinate value representing the starting position, the width W, the height H, the display position in the region, the color, the font name, and the font size.

<Location Data File Creation Process>

Next, the procedure of the location data creation process creating the location data file from the CSV file is described. FIG. 7 is a flowchart showing a location data creation process. When the CPU 2 receives an input designating the CSV file to be processed via the operations device 10 (step S30), an input designating the file name of the location data file to be output (step S31), and an input designating the element definition file to be output (step S32), the CPU 2 creates an initialized element definition file in XML format under the designated name, stores the created element definition file in the HDD 5, reads the designated CSV file from the HDD 5 (step S33), and analyzes the CSV file (step S34). Then, the CPU 2 refers to the extracted data of each menu element written in the CSV file as described above, determines the type of each menu element, and writes the data corresponding to the determined type in the location data file stored in the HDD 5. More specifically, the CPU 2 determines whether the type of the menu element to be processed is other than "text" (step S35). When the determination is affirmative (YES in step S35), the CPU 2 acquires the X coordinate value and the Y coordinate value of the menu element written in the CSV file, pinpoints the locating position of the menu element in the location data file by using the acquired data, and adds a point (index) indicating the locating position to the locating position (step S36). Then, the CPU 2 gives a point name to the point and writes the point data including the point name into the location data file (step S37). The point name may includes the record number of the record storing the extracted data of the menu element which is the line number of the line where the extracted data of the menu element is listed in the CSV file in addition to the type of the menu element.

Figure 8:
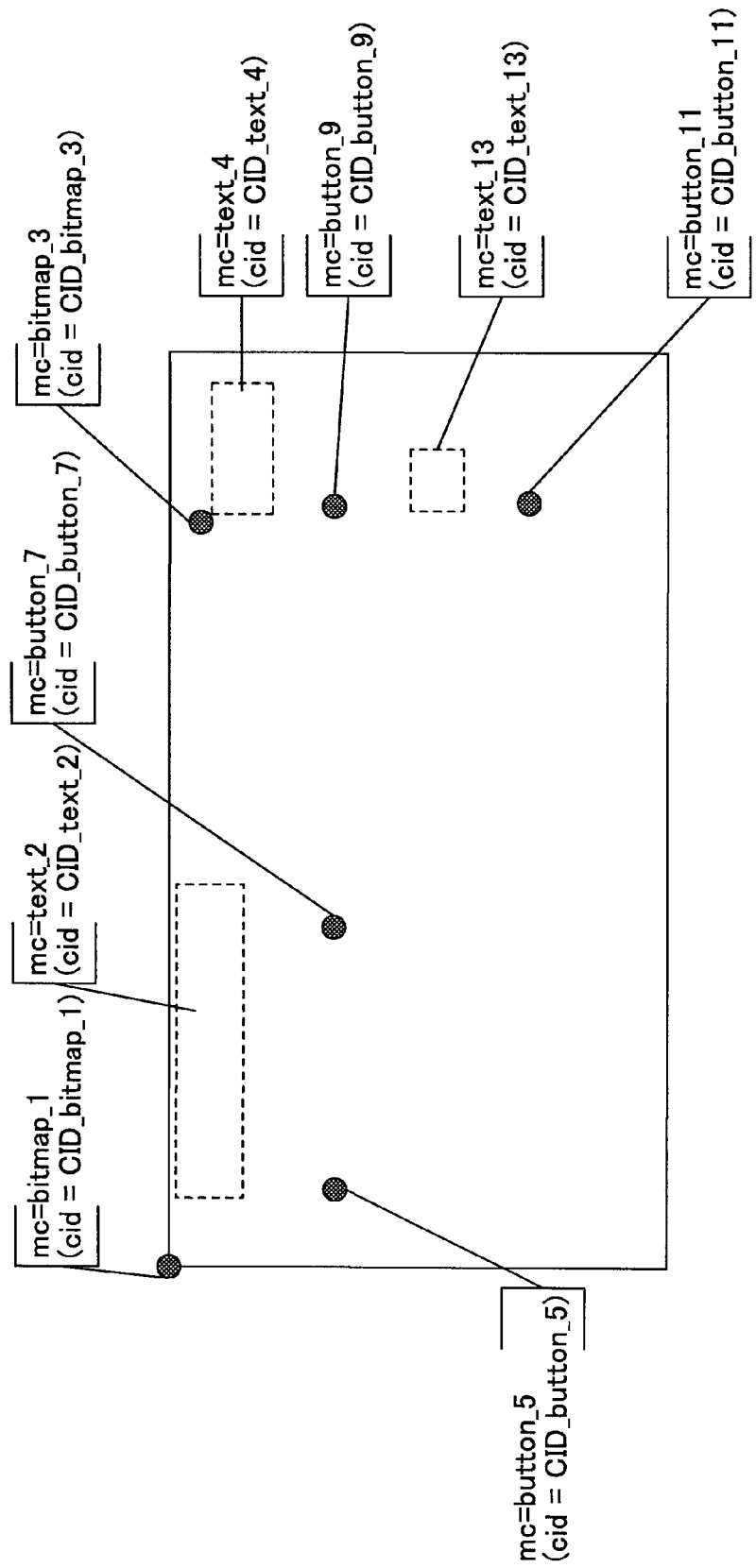
FIG. 8 illustrates an example of data configuration of a location data file according to the embodiment of the present invention.

FIG. 8 illustrates an example of data configuration of a location data file. As shown in FIG. 8, in a location data file, a point indicating the locating position of a menu element is included and the point data pinpointing the position of the point is written at the corresponding locating position. For example, at the upper left-hand portion of the drawing in FIG. 8, the point data including the point name data "bitmap_1" is written.

Referring back to FIG. 7, next, the CPU 2 determines whether the type of the menu element to be processed is "text" (step S38). When the determination is affirmative (YES in step S38), the CPU 2 acquires the data of the X coordinate value and the Y coordinate value, the width W, the height H, the font size, the display position in the region, and the font name of the menu element written in the CSV file, adds a text area having the width W and the Height H at the locating position in the location data file pinpointed by using the acquired X coordinate value and the Y coordinate value (step S39). Then, the CPU 2 gives a point name to the added text area in the same manner as described above and writes the point data including the point name and the data acquired in step S39 into the location data file.

The CPU 2 repeats all the steps S34 through S40 in FIG. 7 for each menu element written in the CSV file. When all the steps S34 through S40 for all the menu elements are finished and the determination in step S41 is affirmative, the element definition file creation process described below is next performed.

<Element Definition File Creation Process>

FIG. 9 is a flowchart showing the element definition file creation process. The CPU 2 analyzes the CSV file read from the HDD 5 (step S50). Then, the CPU 2 refers to the extracted data of each menu element written in the CSV file in the same manner as described above, determines the type of each menu element, and writes the data corresponding to the determined type into the element definition file stored in the HDD 5. More specifically, the CPU 2 determines whether the type of the menu element to be processed is "button" (step S51). When the determination is affirmative (YES in step S51), with respect to the menu element, the CPU 2 acquires the file name written in the CSV file (step S52). Next, the CPU 2 refers to the attached data flag to determine whether the menu element has the corresponding attached data (step S53). When the determination is affirmative (YES in step S53), with respect to the attached data, the CPU 2 acquires the data of the X coordinate value and the Y coordinate value, the width W, the height H, the font size, the color, and the font name written in the CSV file (step S54). Next, the CPU 2 creates the point name consisting of the type of the menu element followed by the line number included in the line where the extracted data of the menu element are written in the CSV file. The CPU 2 further creates the control ID consisting of prescribed letters "CID" as the header of the control ID followed by the created point name. Then, the CPU 2 writes the created point name and the control ID and the control data including the data acquired in step 52 into the element definition file (step S55). When the attached data are acquired in step 54, the CPU 2 writes the created point name and the control ID and the control data including the data acquired in steps 52 and 54 into the element definition file. By the method described above, the CPU 2 associates the menu element whose type is "button" with the menu element of the attached data.

FIG. 10 is a diagram showing the data structure of an element definition file. As shown in FIG. 10, in the element definition file, the control data for each control ID are written. For example, when the type of the menu element is "button" and no attached data are associated with the menu element, the file name is written in both the control ID and the point name. On the other hand, when the type of the menu element is "button" and the attached data are associated with the menu element, as shown in line 5 of the FIG. 10, the data of the file name (msgbtn name="B_001.swf") the X coordinate value (x="0") and the Y coordinate value (y="0"), the width W (w="100"), the height H (h="30"), the font size (size="16"), the color (col="0XFFFFFF") are written along with the control ID (cid="CID_button_5") and the point name (mc="button_5").

Referring back to FIG. 9, next, the CPU 2 determines whether the type of the menu element to be processed is "icon or background" (step S56). When the determination is affirmative (YES in step S56), with respect to the menu element, the CPU 2 acquires the file name written in the CSV file (step S57). Then, the CPU 2 writes the acquired data along with the control ID and the point name of the point where the menu element corresponding to the data is located in the location data file into the element definition file (step S58). Next, the CPU 2 determines whether the type of the menu element to be processed is "text" (step S59). When the determination is affirmative (YES in step S59), with respect to the menu element, the CPU 2 acquires the font size, the color, and the font name written in the CSV file (step S60). Next, the CPU 2 creates the point name consisting of the type of the menu element followed by the line number included in the line where the extracted data of the menu element are written in the CSV file. The CPU 2 further creates the control ID consisting of prescribed letters "CID" as the header of the control ID followed by the created point name. Then, the CPU 2 writes the created point name and the control ID and the control data including the data acquired in step 57 into the element definition file (step S61). When the data are acquired in step 60, the CPU 2 writes the created point name and the control ID and the control data including the data acquired in steps 57 and 60 into the element definition file. As shown in FIG. 10, when the type of the menu element is "text", in the element definition file, the font size, the display position in the region, and the color are written along with the control ID and the file name included in the point data. The CPU 2 repeats the steps of S51 through S61 for each menu element included in the CSV file. When the CPU 2 finishes all the steps S51 through S61 for all the menu elements and the determination in step S62 is affirmative, the element definition file process is completed.

The CPU 2 in the information processing apparatus 1 transmits the location data file and element definition file created as described above to an image processing device via the communication section 7. Those files may be recorded in a computer-readable recording medium such as a CD-ROM, a Flexible Disk (FD), a CD-R, or a Digital Versatile Disk (DVD) in an installable or executable format so that those files are provided to an image processing device via the recording medium. It is assumed that the image processing device has a display device. After receiving the files, the image processing device refers to the point name included in each point data element written in the location data file and the control data including the control ID consisting of "CID" followed by the corresponding point name in the element definition file. Then the image processing device creates a display menu by locating the menu element specified by the control data at the point designated by the point name and displays the created display menu on the display device in the image processing device. As a result, such display menu as shown in FIG. 2 is displayed on the display device.

Advantageously, the display menu created as described above can be customized easily. For example, when the image of the button B1 shown in FIG. 2 is required to be changed, the image can be changed by changing the file name (herein "B_001.swf") designated in the "msgbtn name" of the data (line 5 in FIG. 10) corresponding to the button B1 in the element definition file stored in the HDD 5 into a desired file name. Namely, when the text or the image displayed on the display menu is required to be changed but the locating position of each menu element is not required to be changed, only the data of the element definition file is required to be changed, but the data of the location data file is not required to be changed. Because of this feature, a developer can customize the display menu easily. On the other hand, when only the locating position of each menu element on the display menu is required to be changed, the locating position can be changed by changing the point corresponding to the menu element of the locating position to be changed in the location data file and it is not necessary to change the data of the element definition file. Therefore, in this case, as well, a developer can customize the display menu easily.

The present invention is not limited to the above-mentioned embodiments, and variations and modifications including the following may be made without departing from the scope of the present invention.

<Modification 1>

In the above embodiment, the information processing program may be arranged so that the information processing program can be stored in a computer connected to a network such as the Internet and provided by downloading via the network. Or the information processing program may be stored in a computer-readable recording medium such as a CD-ROM, a Flexible Disk (FD), a CD-R, and a DVD and provided via the recording medium.

<Modification 2>

In the embodiment described above, the element definition creation process is performed after the location data file creation process. However, the location data file creation process may be performed after the element definition creation process or those processes may not be performed exclusively sequentially.

<Modification 3>

In the embodiment described above, the information processing apparatus 1 creates the location data file and the element definition file based on the display menu data and transmits the created files to an image processing device. However, the image processing device may be arranged so as to create the location data file and the element definition file.

As described above, an information processing apparatus, an information processing method, and an information processing program according to an embodiment of the present invention may preferably be used when the information representing a display menu to be displayed on a prescribed display device is created from the data having a prescribed data format and representing an original display menu, wherein the aspect of the created display menu is similar to that of the original display menu.

The present application is based on and claims the benefit of priority of Japanese Patent Application No. 2007-055894, filed on Mar. 6, 2007, the entire contents of which are hereby incorporated by reference.

What is claimed is:

1. An information processing device comprising:
a storage unit configured to store display screen information representing a display screen to be displayed on a display unit, wherein the display screen information is in a prescribed data format; and
a creation unit configured to extract a screen element as an element to be displayed on the display screen and based on the display screen information stored in the storage unit, and create location data file and element definition file, the location data file indicating a locating position of the extracted screen element, the element definition file specifying the screen element to be located at the locating position indicated by the location data file,
wherein the creation unit includes first and second creation units, the first creation unit being configured to extract a type of screen element from among types of a button, a text, an icon, and background, and create conversion information including information indicating the type of the extracted screen element and in a prescribed text format, the second generation unit being configured to create the location data file and the element definition file based on the conversion information created by the first creation unit.

2. The information processing apparatus according to claim 1, wherein in a case that a region of the display screen is defined in a two dimensional coordinate system, the creation unit extracts coordinate values indicating the locating position of the screen element based on the defined two dimensional coordinate system and creates the conversion information including information indicating the coordinate values.

3. The information processing apparatus according to claim 2, wherein the creation unit creates location information including an index indicating the locating position of the screen element using the coordinate values output to the conversion information.

4. The information processing apparatus according to claim 1, wherein
the creation unit extracts specifying information specifying indicating the screen element and creates the conversion information including the specifying information; and
the element definition information file generated based on the conversion information includes the specifying information.

5. The information processing apparatus according to claim 1, wherein
in a case where the type of the screen element is the text, the creation unit extracts coordinate values indicating the locating position of the screen element when a region of the display screen is defined in a two dimensional coordinate system and the height and the width of a locating region where the screen element is located, creates location information including indicating each of the coordinate values, a height, and a width, and creates the location information including the locating region of the screen element created by using the coordinate values, the height, and the width, each output to the conversion information.

6. The information processing apparatus according to claim 1, wherein
in a case that the type of the screen element is a text, a display image of the screen element includes a character image indicating a character, and the creation unit creates the conversion information including information indicating each of a size and an aspect of a character indicated by a character image included in the display image of the screen element and creates the element definition file including the information indicating each of the size and the aspect of the character output to the conversion information.

7. The information processing apparatus according to claim 1, wherein
in a case that the type of the screen element extracted from the display screen information is a button and, on the screen element, there is displayed another screen element whose type is a text or an icon, the creation unit creates the conversion information including information of the screen element whose type is the text or the icon as attached information of the screen element whose type is the text.

8. The information processing apparatus according to claim 7, wherein the creation unit creates the element definition file by associating the information indicating the screen element output to the conversion information as the attachment information of the screen element whose type is the button with the information indicating the screen element whose type is the button.

9. The information processing apparatus according to claim 1, wherein in a case where the type of the screen element is a button, when a region of the display screen is defined in a two dimensional coordinate system, the creation unit creates location information including the information indicating coordinate values indicating the upper right-hand corner of the locating region where the screen element is located.

10. The information processing apparatus according to claim 3, wherein the creation unit gives a first information name to the index included in the location information, the first information name including the type name of the screen element located at the locating position specified by the index and a line number where information of the screen element is output in the conversion information.

11. The information processing apparatus according to claim 10, wherein the creation unit gives a second information name to the information with respect to a display aspect of the screen element included in the element definition file, the second information name including the first information name given to the index specifying the locating position where the screen element is located and a prescribed character.

12. An information processing method performed by an information processing apparatus, comprising:
(a) reading display screen information stored in a storage unit of the information processing apparatus in a prescribed data format, the display screen information indicating a display screen displayed on a display unit of the information processing apparatus;
(b) extracting a screen element as an element to be displayed on the display screen and based on the display screen information read in (a) from the storage unit, extracting a type of screen element from among types of a button, a text, an icon, and background, and creating, by a creation unit of the information processing apparatus, conversion information including information indicating the type of the extracted screen element and in a prescribed text format;

(c) creating, by the creation unit, location data file and element definition file based on the conversion information created in (b), the location data file indicating a locating position of the extracted screen element, the element definition file specifying the screen element to be located at the locating position indicated by the location data file.

13. An information processing program tangibly embodied in a non-transitory storage medium and executable by a processor of the information processing apparatus to cause the information processing apparatus to perform the method of claim 12.

14. The information processing apparatus according to claim 1, further comprising a user interface part configured to receive a user instruction to change said locating position of the extracted screen element, and the information processing apparatus changes said locating position of the extracted screen element in the location information, without accessing the element definition file.

15. The information processing apparatus according to claim 1, further comprising a user interface part configured to receive a user instruction to change said element definition information, and the information processing apparatus changes said element definition file, without accessing the location data file.

16. The information processing apparatus according to claim 1, wherein the location data file and the element definition file are stored in separate and distinct data files.

17. The information processing apparatus according to claim 1, wherein the element definition file specifies at least one of an image file corresponding to the extracted screen element, a size of the extracted screen element, and a color of the extracted screen element.

* * * * *